US012603896B2

(12) United States Patent
Allon et al.

(10) Patent No.: US 12,603,896 B2
(45) Date of Patent: Apr. 14, 2026

(54) AGENT PREVENTION AUGMENTATION BASED ON ORGANIZATIONAL LEARNING

(71) Applicant: PALO ALTO NETWORKS (ISRAEL ANALYTICS) LTD., Tel Aviv (IL)

(72) Inventors: Jonathan Allon, Haifa (IL); Niv Sela, Tel Aviv-Jaffa (IL); Liav Zigelbaum, Herzliya (IL); Guy Pilosof, Shoham (IL); Ori Beck, Tel Aviv-Jaffa (IL)

(73) Assignee: Palo Alto Networks, Inc., Santa Clara, CA (US)

( * ) Notice: Subject to any disclaimer, the term of this patent is extended or adjusted under 35 U.S.C. 154(b) by 152 days.

(21) Appl. No.: 17/676,275

(22) Filed: Feb. 21, 2022

(65) Prior Publication Data

US 2023/0269256 A1     Aug. 24, 2023

(51) Int. Cl.
*H04L 9/40*               (2022.01)
(52) U.S. Cl.
CPC ................................. *H04L 63/1416* (2013.01)
(58) Field of Classification Search
CPC ............. H04L 63/1416; H04L 63/1425; H04L 63/145; H04L 63/1441; G06F 21/554; G06F 21/566; G06F 21/50; G06F 21/55; G06F 21/56
See application file for complete search history.

(56) References Cited

U.S. PATENT DOCUMENTS 5,991,881 A      11/1999  Conklin et al.
6,347,374 B1      2/2002  Drake et al.

6,704,874 B1      3/2004  Porras et al.
7,003,790 B1      2/2006  Noue et al.
7,007,301 B2      2/2006  Crosbie et al.
(Continued)

FOREIGN PATENT DOCUMENTS

CA          3041875 A1      11/2019
CN          1612532 A       5/2005
(Continued)

OTHER PUBLICATIONS

U.S. Appl. No. 17/505,673 Office Action dated Sep. 25, 2023.
(Continued)

*Primary Examiner* — Jung W Kim
*Assistant Examiner* — James P Moles
(74) *Attorney, Agent, or Firm* — Meitar Patents LTD.; Daniel Kligler

(57)                    ABSTRACT

A method, including collecting, by a security server, reports from multiple computing devices of events belonging to a set of specified event types occurring in execution of software processes on the devices, and collating the reports in the server to extract context information with respect to each of the events. Upon detecting an event occurring in execution of a process on a given device and matching one of the types, a software agent executing on the given device extracts, one or more features from the detected event, and conveys a query with respect to the detected event from the agent to the server. Upon receiving, from the server in response to the query, the context information with respect to the detected event, the agent decides to initiate a protective action on the given device based on the received context information and the one or more features extracted by the agent.

21 Claims, 5 Drawing Sheets

(56)     References Cited

U.S. PATENT DOCUMENTS

| | | | |
|---|---|---|---|
| 7,178,164 B1 | 2/2007 | Bonnes | |
| 7,181,769 B1 | 2/2007 | Keanini et al. | |
| 7,523,016 B1 | 4/2009 | Surdulescu et al. | |
| 7,684,568 B2 | 3/2010 | Yonge, III et al. | |
| 7,694,150 B1 | 4/2010 | Kirby | |
| 7,703,138 B2 | 4/2010 | Desai et al. | |
| 7,712,134 B1 | 5/2010 | Nucci et al. | |
| 7,752,665 B1 | 7/2010 | Robertson et al. | |
| 7,908,655 B1 | 3/2011 | Bhattacharyya et al. | |
| 8,245,298 B2 | 8/2012 | Pletka et al. | |
| 8,397,284 B2 | 3/2013 | Kommareddy et al. | |
| 8,429,180 B1 | 4/2013 | Sobel et al. | |
| 8,490,190 B1 | 7/2013 | Hernacki et al. | |
| 8,516,573 B1 | 8/2013 | Brown et al. | |
| 8,516,586 B1 | 8/2013 | Jensen et al. | |
| 8,555,388 B1 | 10/2013 | Wang et al. | |
| 8,578,345 B1 | 11/2013 | Kennedy et al. | |
| 8,607,353 B2 | 12/2013 | Rippert, Jr. et al. | |
| 8,620,942 B1 | 12/2013 | Hoffman et al. | |
| 8,677,487 B2 | 3/2014 | Balupari et al. | |
| 8,762,288 B2 | 6/2014 | Dill | |
| 8,769,681 B1 | 7/2014 | Michels et al. | |
| 8,925,095 B2 | 12/2014 | Herz et al. | |
| 8,966,625 B1 | 2/2015 | Zuk et al. | |
| 9,038,178 B1 | 5/2015 | Lin | |
| 9,118,582 B1 | 8/2015 | Martini | |
| 9,147,071 B2 | 9/2015 | Sallam | |
| 9,231,962 B1 | 1/2016 | Yen et al. | |
| 9,319,421 B2 | 4/2016 | Ferragut et al. | |
| 9,342,691 B2 | 5/2016 | Maestas | |
| 9,378,361 B1 | 6/2016 | Yen et al. | |
| 9,386,028 B2 | 7/2016 | Altman | |
| 9,531,614 B1 | 12/2016 | Nataraj et al. | |
| 9,531,736 B1 | 12/2016 | Torres et al. | |
| 9,690,606 B1 * | 6/2017 | Ha | G06F 9/45558 |
| 9,690,933 B1 | 6/2017 | Singh et al. | |
| 9,736,251 B1 | 8/2017 | Samant et al. | |
| 9,773,112 B1 | 9/2017 | Rathor et al. | |
| 9,979,739 B2 | 5/2018 | Mumcuoglu et al. | |
| 9,979,742 B2 | 5/2018 | Mumcuoglu et al. | |
| 10,027,694 B1 | 7/2018 | Gupta et al. | |
| 10,075,461 B2 | 9/2018 | Mumcuoglu et al. | |
| 10,140,453 B1 | 11/2018 | Fridakis | |
| 10,181,032 B1 | 1/2019 | Sadaghiani et al. | |
| 10,237,875 B1 | 3/2019 | Romanov | |
| 10,360,367 B1 | 7/2019 | Mossoba et al. | |
| 10,423,789 B2 * | 9/2019 | Barak | G06F 21/577 |
| 10,587,642 B1 | 3/2020 | Herman-Saffar et al. | |
| 10,706,144 B1 | 7/2020 | Moritz et al. | |
| 10,728,262 B1 | 7/2020 | Vaswani et al. | |
| 10,728,281 B2 | 7/2020 | Kurakami | |
| 10,873,596 B1 | 12/2020 | Bourget et al. | |
| 10,904,277 B1 | 1/2021 | Sharifi Mehr | |
| 11,100,199 B2 | 8/2021 | Subramaniam | |
| 11,140,194 B2 | 10/2021 | Hecht | |
| 11,178,168 B1 * | 11/2021 | Lin | H04L 63/1433 |
| 11,277,423 B2 * | 3/2022 | Brown | H04L 63/1416 |
| 11,501,261 B1 | 11/2022 | Schemers et al. | |
| 11,956,253 B1 | 4/2024 | Lin et al. | |
| 12,045,610 B1 | 7/2024 | Myers et al. | |
| 12,380,389 B2 | 8/2025 | Schmidt et al. | |
| 2002/0059078 A1 | 5/2002 | Valdes et al. | |
| 2002/0133586 A1 | 9/2002 | Shanklin et al. | |
| 2003/0110396 A1 | 6/2003 | Lewis et al. | |
| 2003/0133443 A1 | 7/2003 | Klinker et al. | |
| 2004/0003286 A1 | 1/2004 | Kaler et al. | |
| 2004/0015728 A1 | 1/2004 | Cole et al. | |
| 2004/0117658 A1 | 6/2004 | Klaes | |
| 2004/0199793 A1 | 10/2004 | Wilken et al. | |
| 2004/0210769 A1 | 10/2004 | Radatti et al. | |
| 2004/0250169 A1 | 12/2004 | Takemori et al. | |
| 2004/0260733 A1 | 12/2004 | Adelstein et al. | |
| 2005/0015624 A1 | 1/2005 | Ginter et al. | |
| 2005/0018618 A1 | 1/2005 | Mualem et al. | |
| 2005/0060295 A1 | 3/2005 | Gould et al. | |
| 2005/0069130 A1 | 3/2005 | Kobayashi | |
| 2005/0071330 A1 | 3/2005 | Douceur et al. | |
| 2005/0123138 A1 | 6/2005 | Abe et al. | |
| 2005/0128989 A1 | 6/2005 | Bhagwat et al. | |
| 2005/0183120 A1 | 8/2005 | Jain et al. | |
| 2005/0216749 A1 | 9/2005 | Brent | |
| 2005/0262556 A1 | 11/2005 | Waisman et al. | |
| 2005/0262560 A1 | 11/2005 | Gassoway | |
| 2005/0268112 A1 | 12/2005 | Wang et al. | |
| 2005/0286423 A1 | 12/2005 | Poletto et al. | |
| 2006/0018466 A1 | 1/2006 | Adelstein et al. | |
| 2006/0075462 A1 | 4/2006 | Golan | |
| 2006/0075492 A1 | 4/2006 | Golan et al. | |
| 2006/0075500 A1 | 4/2006 | Bertman et al. | |
| 2006/0107321 A1 | 5/2006 | Tzadikario | |
| 2006/0126522 A1 | 6/2006 | Oh | |
| 2006/0136720 A1 | 6/2006 | Armstrong et al. | |
| 2006/0137009 A1 | 6/2006 | Chesla | |
| 2006/0149848 A1 | 7/2006 | Shay | |
| 2006/0156398 A1 | 7/2006 | Ross et al. | |
| 2006/0161984 A1 | 7/2006 | Phillips et al. | |
| 2006/0190803 A1 | 8/2006 | Kawasaki et al. | |
| 2006/0191010 A1 | 8/2006 | Benjamin | |
| 2006/0215627 A1 | 9/2006 | Waxman | |
| 2006/0242694 A1 | 10/2006 | Gold et al. | |
| 2006/0259967 A1 | 11/2006 | Thomas et al. | |
| 2006/0282893 A1 | 12/2006 | Wu et al. | |
| 2007/0011319 A1 | 1/2007 | McClure et al. | |
| 2007/0072661 A1 | 3/2007 | Lototski | |
| 2007/0073519 A1 | 3/2007 | Long | |
| 2007/0116277 A1 | 5/2007 | Ro et al. | |
| 2007/0124474 A1 | 5/2007 | Margulis | |
| 2007/0198603 A1 | 8/2007 | Tsioutsiouliklis et al. | |
| 2007/0201691 A1 | 8/2007 | Kumagaya | |
| 2007/0201693 A1 | 8/2007 | Ohno | |
| 2007/0218874 A1 | 9/2007 | Sinha et al. | |
| 2007/0226796 A1 | 9/2007 | Gilbert et al. | |
| 2007/0226802 A1 | 9/2007 | Gopalan et al. | |
| 2007/0245420 A1 | 10/2007 | Yong et al. | |
| 2007/0255724 A1 | 11/2007 | Jung et al. | |
| 2007/0283166 A1 | 12/2007 | Yami et al. | |
| 2008/0005782 A1 | 1/2008 | Aziz | |
| 2008/0013725 A1 | 1/2008 | Kobayashi | |
| 2008/0016339 A1 | 1/2008 | Shukla | |
| 2008/0016570 A1 | 1/2008 | Capalik | |
| 2008/0104046 A1 | 5/2008 | Singla et al. | |
| 2008/0104703 A1 | 5/2008 | Rihn et al. | |
| 2008/0134296 A1 | 6/2008 | Amitai et al. | |
| 2008/0148381 A1 | 6/2008 | Aaron | |
| 2008/0198005 A1 | 8/2008 | Schulak et al. | |
| 2008/0244097 A1 | 10/2008 | Candelore et al. | |
| 2008/0262991 A1 | 10/2008 | Kapoor et al. | |
| 2008/0271143 A1 | 10/2008 | Stephens et al. | |
| 2008/0285464 A1 | 11/2008 | Katzir | |
| 2008/0301567 A1 | 12/2008 | Martin et al. | |
| 2009/0007100 A1 | 1/2009 | Field et al. | |
| 2009/0007220 A1 | 1/2009 | Ormazabal et al. | |
| 2009/0115570 A1 | 5/2009 | Cusack, Jr. | |
| 2009/0157574 A1 | 6/2009 | Lee | |
| 2009/0164522 A1 | 6/2009 | Fahey | |
| 2009/0193103 A1 | 7/2009 | Small et al. | |
| 2009/0265777 A1 | 10/2009 | Scott | |
| 2009/0320136 A1 | 12/2009 | Ambert et al. | |
| 2010/0014594 A1 | 1/2010 | Beheydt et al. | |
| 2010/0054241 A1 | 3/2010 | Shah et al. | |
| 2010/0071063 A1 | 3/2010 | Wang et al. | |
| 2010/0107257 A1 | 4/2010 | Ollmann | |
| 2010/0146292 A1 | 6/2010 | Shi et al. | |
| 2010/0146293 A1 | 6/2010 | Shi et al. | |
| 2010/0146501 A1 | 6/2010 | Wyatt et al. | |
| 2010/0162400 A1 | 6/2010 | Feeney et al. | |
| 2010/0197318 A1 | 8/2010 | Petersen et al. | |
| 2010/0212013 A1 | 8/2010 | Kim et al. | |
| 2010/0217861 A1 | 8/2010 | Wu | |
| 2010/0235915 A1 | 9/2010 | Memon et al. | |
| 2010/0268818 A1 | 10/2010 | Richmond et al. | |
| 2010/0272257 A1 | 10/2010 | Beals | |
| 2010/0278054 A1 | 11/2010 | Dighe | |
| 2010/0280978 A1 | 11/2010 | Shimada et al. | |

(56)　　　　　References Cited

U.S. PATENT DOCUMENTS

| | | |
|---|---|---|
| 2010/0284282 A1 | 11/2010 | Golic |
| 2010/0299430 A1 | 11/2010 | Powers et al. |
| 2011/0026521 A1 | 2/2011 | Gamage et al. |
| 2011/0035795 A1 | 2/2011 | Shi |
| 2011/0087779 A1 | 4/2011 | Martin et al. |
| 2011/0125770 A1 | 5/2011 | Battestini et al. |
| 2011/0135090 A1 | 6/2011 | Chan et al. |
| 2011/0138463 A1 | 6/2011 | Kim et al. |
| 2011/0153748 A1 | 6/2011 | Lee et al. |
| 2011/0185055 A1 | 7/2011 | Nappier et al. |
| 2011/0185421 A1 | 7/2011 | Wittenstein et al. |
| 2011/0214187 A1 | 9/2011 | Wittenstein et al. |
| 2011/0247071 A1 | 10/2011 | Hooks et al. |
| 2011/0265011 A1 | 10/2011 | Taylor et al. |
| 2011/0270957 A1 | 11/2011 | Phan et al. |
| 2011/0271343 A1 | 11/2011 | Kim et al. |
| 2011/0302653 A1 | 12/2011 | Frantz et al. |
| 2011/0317770 A1 | 12/2011 | Lehtiniemi et al. |
| 2012/0042060 A1 | 2/2012 | Jackowski et al. |
| 2012/0079596 A1 | 3/2012 | Thomas et al. |
| 2012/0102359 A1 | 4/2012 | Hooks |
| 2012/0136802 A1 | 5/2012 | Mcquade et al. |
| 2012/0137342 A1 | 5/2012 | Hartrell et al. |
| 2012/0143650 A1 | 6/2012 | Crowley et al. |
| 2012/0191660 A1 | 7/2012 | Hoog |
| 2012/0222120 A1 | 8/2012 | Rim et al. |
| 2012/0233311 A1 | 9/2012 | Parker et al. |
| 2012/0240185 A1 | 9/2012 | Kapoor et al. |
| 2012/0275505 A1 | 11/2012 | Tzannes et al. |
| 2012/0308008 A1 | 12/2012 | Kondareddy et al. |
| 2012/0331553 A1 | 12/2012 | Aziz et al. |
| 2013/0031037 A1 | 1/2013 | Brandt et al. |
| 2013/0031600 A1 | 1/2013 | Luna et al. |
| 2013/0061045 A1 | 3/2013 | Kiefer et al. |
| 2013/0083700 A1 | 4/2013 | Sndhu et al. |
| 2013/0097706 A1 | 4/2013 | Titonis et al. |
| 2013/0111211 A1 | 5/2013 | Winslow et al. |
| 2013/0196549 A1 | 8/2013 | Sorani |
| 2013/0298237 A1 | 11/2013 | Smith |
| 2013/0298243 A1 | 11/2013 | Kumar et al. |
| 2013/0333041 A1 | 12/2013 | Christodorescu et al. |
| 2014/0010367 A1 | 1/2014 | Wang |
| 2014/0013434 A1 | 1/2014 | Ranum et al. |
| 2014/0165207 A1 | 6/2014 | Engel et al. |
| 2014/0198669 A1 | 7/2014 | Brown et al. |
| 2014/0201776 A1 | 7/2014 | Minemura et al. |
| 2014/0215619 A1 | 7/2014 | Lee et al. |
| 2014/0230059 A1 | 8/2014 | Wang |
| 2014/0325643 A1 | 10/2014 | Bart et al. |
| 2015/0026810 A1 | 1/2015 | Friedrichs et al. |
| 2015/0032884 A1* | 1/2015 | Greifeneder ........ G06F 11/3419 |
| | | 709/224 |
| 2015/0040219 A1 | 2/2015 | Garraway et al. |
| 2015/0047032 A1 | 2/2015 | Hannis et al. |
| 2015/0071308 A1 | 3/2015 | Webb, III et al. |
| 2015/0121461 A1 | 4/2015 | Dulkin et al. |
| 2015/0156270 A1 | 6/2015 | Teraoka et al. |
| 2015/0180883 A1 | 6/2015 | Aktas et al. |
| 2015/0195300 A1 | 7/2015 | Adjaoute |
| 2015/0207694 A1 | 7/2015 | Inches et al. |
| 2015/0264069 A1 | 9/2015 | Beauchesne et al. |
| 2015/0295903 A1 | 10/2015 | Yi et al. |
| 2015/0304346 A1 | 10/2015 | Kim |
| 2015/0324188 A1 | 11/2015 | Raje et al. |
| 2015/0341380 A1 | 11/2015 | Heo et al. |
| 2015/0341389 A1 | 11/2015 | Kurakami |
| 2015/0356451 A1* | 12/2015 | Gupta ................... G06F 21/552 |
| | | 706/46 |
| 2016/0021141 A1 | 1/2016 | Liu et al. |
| 2016/0028758 A1* | 1/2016 | Ellis ................... H04L 63/1441 |
| | | 726/25 |
| 2016/0119292 A1 | 4/2016 | Kaseda et al. |
| 2016/0127390 A1 | 5/2016 | Lai et al. |
| 2016/0142746 A1 | 5/2016 | Schuberth |
| 2016/0191918 A1 | 6/2016 | Lai et al. |
| 2016/0234167 A1 | 8/2016 | Engel et al. |
| 2016/0247163 A1 | 8/2016 | Donsky et al. |
| 2016/0315954 A1 | 10/2016 | Peterson et al. |
| 2016/0323299 A1 | 11/2016 | Huston, III |
| 2016/0359895 A1 | 12/2016 | Chiu et al. |
| 2017/0007128 A1 | 1/2017 | Takano et al. |
| 2017/0026387 A1 | 1/2017 | Vissamsetty et al. |
| 2017/0026395 A1 | 1/2017 | Mumcuoglu et al. |
| 2017/0054744 A1 | 2/2017 | Mumcuoglu et al. |
| 2017/0063912 A1* | 3/2017 | Muddu .................. G06N 5/022 |
| 2017/0063921 A1 | 3/2017 | Fridman et al. |
| 2017/0078312 A1 | 3/2017 | Yamada et al. |
| 2017/0111376 A1 | 4/2017 | Friedlander et al. |
| 2017/0171229 A1 | 6/2017 | Arzi et al. |
| 2017/0171231 A1 | 6/2017 | Reybok et al. |
| 2017/0262633 A1 | 9/2017 | Miserendino et al. |
| 2017/0289178 A1* | 10/2017 | Roundy ............. H04L 63/1425 |
| 2017/0294112 A1 | 10/2017 | Kushnir |
| 2017/0295190 A1* | 10/2017 | Brown ................ H04W 12/122 |
| 2017/0374090 A1 | 12/2017 | McGrew et al. |
| 2018/0004948 A1 | 1/2018 | Martin et al. |
| 2018/0007013 A1 | 1/2018 | Wang |
| 2018/0048662 A1 | 2/2018 | Jang et al. |
| 2018/0075240 A1* | 3/2018 | Chen ..................... G06F 21/566 |
| 2018/0077189 A1 | 3/2018 | Doppke et al. |
| 2018/0288081 A1 | 10/2018 | Yermakov |
| 2018/0332064 A1 | 11/2018 | Harris et al. |
| 2018/0365416 A1* | 12/2018 | Monastyrsky ...... H04W 12/128 |
| 2018/0373820 A1 | 12/2018 | Knezevic et al. |
| 2019/0036978 A1* | 1/2019 | Shulman-Peleg ....... G06F 21/53 |
| 2019/0044963 A1 | 2/2019 | Rajasekharan et al. |
| 2019/0044965 A1 | 2/2019 | Pilkington et al. |
| 2019/0065738 A1* | 2/2019 | Kim ...................... G06F 21/57 |
| 2019/0068620 A1 | 2/2019 | Avrahami et al. |
| 2019/0075344 A1 | 3/2019 | Brown |
| 2019/0098025 A1 | 3/2019 | Lim |
| 2019/0207966 A1 | 7/2019 | Vashisht et al. |
| 2019/0268361 A1* | 8/2019 | Blewett .................. G06F 21/57 |
| 2019/0297097 A1 | 9/2019 | Gong et al. |
| 2019/0319981 A1 | 10/2019 | Meshi et al. |
| 2019/0334931 A1 | 10/2019 | Arlitt et al. |
| 2020/0007566 A1 | 1/2020 | Wu |
| 2020/0033144 A1 | 1/2020 | Du et al. |
| 2020/0065483 A1* | 2/2020 | Mu ....................... G06F 21/554 |
| 2020/0082296 A1 | 3/2020 | Fly et al. |
| 2020/0136889 A1 | 4/2020 | Chen et al. |
| 2020/0137085 A1* | 4/2020 | Kostyushko ............ G06F 21/53 |
| 2020/0145435 A1 | 5/2020 | Chiu et al. |
| 2020/0162252 A1 | 5/2020 | Davis et al. |
| 2020/0162494 A1 | 5/2020 | Rostami-Hesarsorkh |
| 2020/0167491 A1* | 5/2020 | Grabois ................ G06F 21/568 |
| 2020/0193019 A1* | 6/2020 | Tietz ..................... G06N 5/027 |
| 2020/0195673 A1 | 6/2020 | Lee |
| 2020/0244658 A1 | 7/2020 | Meshi et al. |
| 2020/0244675 A1 | 7/2020 | Meshi et al. |
| 2020/0244676 A1 | 7/2020 | Amit et al. |
| 2020/0244683 A1 | 7/2020 | Meshi et al. |
| 2020/0244684 A1 | 7/2020 | Meshi et al. |
| 2020/0274880 A1* | 8/2020 | Badawy .................. H04L 63/08 |
| 2020/0274894 A1 | 8/2020 | Argoeti et al. |
| 2020/0285737 A1 | 9/2020 | Kraus et al. |
| 2020/0293917 A1 | 9/2020 | Wang et al. |
| 2020/0327221 A1 | 10/2020 | Street |
| 2020/0327225 A1* | 10/2020 | Nguyen ................. G06N 3/084 |
| 2020/0342230 A1 | 10/2020 | Tsai et al. |
| 2020/0374301 A1 | 11/2020 | Manevich et al. |
| 2021/0004458 A1 | 1/2021 | Edwards et al. |
| 2021/0064751 A1* | 3/2021 | Li ...................... G06F 18/2413 |
| 2021/0084063 A1 | 3/2021 | Triantafillos et al. |
| 2021/0176261 A1* | 6/2021 | Yavo ..................... G06N 20/00 |
| 2021/0182387 A1* | 6/2021 | Zhu ......................... G06N 7/01 |
| 2021/0209228 A1 | 7/2021 | Maor et al. |
| 2021/0224676 A1 | 7/2021 | Arzani et al. |
| 2021/0248503 A1 | 8/2021 | Hickey et al. |
| 2021/0264028 A1 | 8/2021 | Genc et al. |
| 2021/0266339 A1 | 8/2021 | Moshitzky et al. |
| 2021/0273958 A1* | 9/2021 | McLean ............. H04L 63/1433 |
| 2021/0286877 A1* | 9/2021 | Vijayvargiya ...... G06F 9/45558 |
| 2021/0304204 A1 | 9/2021 | Ramesh et al. |

(56) References Cited

U.S. PATENT DOCUMENTS

| 2021/0400070 | A1* | 12/2021 | Ackerman | H04L 63/20 |
| 2022/0086178 | A1 | 3/2022 | Jayamohan et al. | |
| 2022/0129551 | A1* | 4/2022 | Collier | G06F 21/565 |
| 2022/0138856 | A1 | 5/2022 | Ahlstrom et al. | |
| 2022/0217156 | A1 | 7/2022 | Wahbo | |
| 2022/0217166 | A1* | 7/2022 | Ladnai | G06F 21/554 |
| 2023/0007023 | A1 | 1/2023 | Andrabi et al. | |
| 2023/0026385 | A1 | 1/2023 | Zhang et al. | |
| 2023/0075355 | A1 | 3/2023 | Twigg et al. | |
| 2023/0114821 | A1 | 4/2023 | Thomas et al. | |
| 2023/0117120 | A1 | 4/2023 | Johnson | |
| 2023/0129144 | A1 | 4/2023 | Neil et al. | |
| 2023/0164039 | A1 | 5/2023 | Vadlamani | |
| 2023/0164162 | A1 | 5/2023 | Lee et al. | |
| 2023/0171235 | A1 | 6/2023 | Chhibber et al. | |
| 2023/0229771 | A1 | 7/2023 | Sameer et al. | |
| 2023/0247048 | A1* | 8/2023 | Samosseiko | H04L 63/1425 726/23 |
| 2023/0403294 | A1 | 12/2023 | Bazalgette et al. | |
| 2024/0095350 | A1 | 3/2024 | Withnell et al. | |
| 2024/0126910 | A1 | 4/2024 | Johnson et al. | |
| 2024/0289461 | A1 | 8/2024 | Ko et al. | |
| 2024/0303529 | A1 | 9/2024 | Rane et al. | |
| 2024/0338489 | A1 | 10/2024 | Zhu et al. | |
| 2024/0340306 | A1 | 10/2024 | Staab | |
| 2024/0378423 | A1 | 11/2024 | Gunnai et al. | |
| 2024/0380766 | A1 | 11/2024 | Shachar et al. | |
| 2024/0386015 | A1 | 11/2024 | Crabtree et al. | |
| 2024/0414178 | A1 | 12/2024 | Neuvirth-Telem et al. | |
| 2025/0007882 | A1 | 1/2025 | Akhtar et al. | |
| 2025/0094585 | A1 | 3/2025 | Wuest et al. | |
| 2025/0173431 | A1 | 5/2025 | Divakaran et al. | |
| 2025/0181718 | A1 | 6/2025 | Saqib et al. | |
| 2025/0217479 | A1 | 7/2025 | Palanki | |
| 2025/0247402 | A1 | 7/2025 | Singla | |
| 2025/0260712 | A1 | 8/2025 | Hong et al. | |

FOREIGN PATENT DOCUMENTS

| CN | 101536455 | A | 9/2009 | |
| CN | 103561048 | A | 2/2014 | |
| CN | 106131050 | A | 11/2016 | |
| CN | 114640507 | A | 6/2022 | |
| CN | 109104395 | A | 8/2022 | |
| CN | 115396324 | A | 11/2022 | |
| CN | 116074031 | A | 5/2023 | |
| EP | 0952521 | A2 | 10/1999 | |
| EP | 2056559 | A1 | 5/2009 | |
| GB | 0401420 | | 2/2004 | |
| JP | 2009111448 | A | 5/2009 | |
| JP | 2021523451 | A | 9/2021 | |
| WO | 03083660 | A1 | 10/2003 | |
| WO | WO-2015149062 | A1* | 10/2015 | G06F 21/52 |

OTHER PUBLICATIONS

U.S. Appl. No. 17/700,579 Office Action dated Oct. 13, 2023.
AU Application # 2021351215 Office Action dated Nov. 28, 2023.
U.S. Appl. No. 17/175,720 Office Action dated Nov. 7, 2022.
U.S. Appl. No. 17/506,713 Office Action dated Nov. 8, 2022.
Brownlee et al., "Traffic Flow Measurement: Architecture," Request for Comments 2722, Network Working Group, pp. 1-48, Oct. 1999.
U.S. Appl. No. 17/571,558 Office Action dated Jun. 26, 2023.
Palo Alto Networks, Inc., "CORTEX XSOAR—Redefining Security Orchestration and Automation," product Information, pp. 1-2, year 2020.
Light Cyber Ltd, "LightCyber Magna", pp. 1-3, year 2011.
Tier-3 Pty Ltd, "Huntsman Protector 360", Brochure, pp. 1-2, Apr. 1, 2010.
Tier-3 Pty Ltd, "Huntsman 5.7 The Power of 2", Brochure, pp. 1-2, Oct. 8, 2012.
Bilge et at., "DISCLOSURE: Detecting Botnet Command and Control Servers Through Large-Scale NetFlow Analysis", ACSAC, pp. 1-10, Dec. 3-7, 2012.
Blum., "Combining Labeled and Unlabeled Data with Co-Training", Carnegie Mellon University, Research Showcase @ CMU, Computer Science Department, pp. 1-11, Jul. 1998.
Felegyhazi et al., "On the Potential of Proactive Domain Blacklisting", LEET'10 Proceedings of the 3rd USENIX Conference on Large-scale exploits and emergent threats, pp. 1-8, San Jose, USA, Apr. 27, 2010.
FROSCH., "Mining DNS-related Data for Suspicious Features", Ruhr Universitat Bochum, Master'sThesis, pp. 1-88, Dec. 23, 2011.
BILGE at al., "EXPOSURE: Finding Malicious Domains Using Passive DNS Analysis ", NDSS Symposium, pp. 1-17, Feb. 6-9, 2011.
Gross et al., "FIRE: Finding Rogue Networks", Annual Conference on Computer Security Applications (ACSAC'09), bages 1-10, Dec. 7-11, 2009.
Markowitz, N., "Bullet Proof Hosting: A Theoretical Model", Security Week, [pp. 1-5, Jun. 29, 2010, downloaded from http://www.infosecisland.com/blogview/4487-Bullet-Proof-Hosting-A-Theoretical-Model.html.
Konte et al., "ASwatch: An AS Reputation System to Expose Bulletproof Hosting ASes", SIGCOMM , pp. 625-638, Aug. 17-21, 2015.
Markowitz, N., "Patterns of Use and Abuse with IP Addresses", Security Week, pp. 1-4, Jul. 10, 2010, downloaded from http://infosecisland.com/blogview/5068-Patterns-of-Use-and-Abuse-with-IP-Addresses.html.
Wei et al., "Identifying New Spam Domains by Hosting IPs: Improving Domain Blacklisting", Department of Computer and Information Sciences, University of Alabama at Birmingham, USA, pp. 1-8, Dec. 8, 2010.
Goncharov,M., "Criminal Hideouts for Lease: Bulletproof Hosting Services", Forward-Looking Threat Research (FTR) Team, A TrendLabsSM Research Paper, pp. 1-28, Jul. 3, 2015.
Xu, "Correlation Analysis of Intrusion Alerts," Dissertation in Computer Science submitted to the Graduate Faculty, North Carolina State University, pp. 1-206, year 2006.
U.S. Appl. No. 17/038,285 Office Action dated Mar. 21, 2022.
Asrigo et al., "Using VMM-based sensors to monitor honeypots," Proceedings of the 2nd International Conference on Virtual Execution Environments, pp. 13-23, Jun. 14, 2006.
Bhuyan et al., "Surveying Port Scans and Their Detection Methodologies", Computer Journal, vol. 54, No. 10, pp. 1565-1581, Apr. 20, 2011.
Skormin, "Anomaly-Based Intrusion Detection Systems Utilizing System Call Data", Watson School of Engineering at Binghamton University, pp. 1-82, Mar. 1, 2012.
Palo Alto Networks, "Cortex XDR", datasheet, pp. 1-7, year 2020.
Palo Alto Networks, "WildFire", datasheet, pp. 1-6, year 2020.
Barford et al., "Characteristics of Network Traffic Flow Anomalies," Proceedings of the 1st ACM SIGCOMM Workshop on Internet Measurement, pp. 69-73, year 2001.
"PA-3250 Next Generation Firewall," PS-3200 Series, Datasheet, Palo Alto Networks, Inc., Santa Clara, CA, USA, pp. 1-4, year 2021.
"What is PCI DSS?" Palo Alto Networks, Cyberpedia, pp. 1-5, year 2021, as downloaded from https://www.paloaltonetworks.com/cyberpedia/what-is-a-pci-dss.
Wikipedia, "Active Directory," pp. 1-14, last edited Oct. 2021.
International Application # PCT/IB2021/058621 Search Report dated Dec. 14, 2021.
Steimberg et al., U.S. Appl. No. 17/038,285, filed Sep. 30, 2020.
Rimer et al., U.S. Appl. No. 17/505,673, filed Oct. 20, 2021.
Meshi et al., U.S. Appl. No. 17/571,558, filed Jan. 10, 2022.
Niksun, "Network Intrusion Forensic System (NIFS) for Intrusion Detection and Advanced Post Incident Forensics", Whitepaper, pp. 1-12, Feb. 15, 2010.
Shulman, A., "Top Ten Database Security Threats How to Mitigate the Most Significant Database Vulnerabilities", White Paper, pp. 1-14, year 2006.
International Application # PCT/IB2022/059544 Search Report dated Jan. 20, 2023.

(56)          References Cited

OTHER PUBLICATIONS

International Application # PCT/IB2022/060920 Search Report dated Feb. 7, 2023.
EP Application # 19832439.4 Office Action dated Mar. 1, 2023.
U.S. Appl. No. 17/175,720 Office Action dated Mar. 20, 2023.
International Application # PCT/IB2022/061926 Search Report dated Mar. 27, 2023.
U.S. Appl. No. 17/700,579 Office Action dated Mar. 23, 2023.
U.S. Appl. No. 17/464,716 Office Action dated Apr. 14, 2023.
U.S. Appl. No. 17/464,709 Office Action dated Apr. 14, 2023.
AU Application # 2022370400 Office Action dated Jun. 12, 2024.
International Application # PCT/IB2024/052646 Search Report dated Jun. 14, 2024.
U.S. Appl. No. 18/357,121 Office Action dated May 2, 2025.
U.S. Appl. No. 18/361,850 Office Action dated May 3, 2025.
Final Office Action for U.S. Appl. No. 18/357,121, dated Oct. 23, 2025.
Notice of References Cited for U.S. Appl. No. 18/357,121, dated Oct. 23, 2025.
Non-Final Office Action for U.S. Appl. No. 18/661,626, dated Oct. 1, 2025.
Notice of References Cited for U.S. Appl. No. 18/661,626, dated Oct. 1, 2025.
Non-Final Office Action for U.S. Appl. No. 18/783,523, dated Oct. 21, 2025.
Notice of References Cited for U.S. Appl. No. 18/783,523, dated Oct. 21, 2025.
Non-Final Office Action for U.S. Appl. No. 18/731,420, dated Oct. 2, 2025.
Notice of References Cited for U.S. Appl. No. 18/731,420, dated Oct. 2, 2025.
Final Office Action for U.S. Appl. No. 18/361,850, dated Sep. 30, 2025.
Notice of References Cited for U.S. Appl. No. 18/361,850, dated Sep. 30, 2025.
Decision on Appeal (Appeal 2024-003437) for U.S. Appl. No. 17/700,579, dated Jul. 30, 2025.
Non-Final Office Action for U.S. Appl. No. 18/499,256, dated Aug. 18, 2025.
Non-Final Office Action for U.S. Appl. No. 18/322,231, dated Sep. 30, 2025.

Notice of References Cited for U.S. Appl. No. 18/322,231, dated Sep. 30, 2025.
Australian Application No. 2022441431, Examination report No. 1 dated Jul. 3, 2025.
Second Office Action, Chinese Application No. 202310649426.9, dated Sep. 16, 2025.
First Office Action, Chinese Application No. 202310649332.1, dated Aug. 6, 2025.
Search Report, Chinese Application No. 202310649332.1, dated Aug. 4, 2025.
First Office Action, Chinese Application No. 202310649492.6, dated Jul. 24, 2025.
Search Report, Chinese Application No. 202310649492.6, dated Jul. 21, 2025.
Non-Final Office Action U.S. Appl. No. 18/361,850, dated Dec. 30, 2025.
List of References, U.S. Appl. No. 18/361,850, dated Dec. 30, 2025.
US Final Office Action, U.S. Appl. No. 18/322,231, dated Mar. 5, 2026.
US Notice of References Cited, U.S. Appl. No. 18/322,231, dated Mar. 5, 2026.
US Notice of References Cited, U.S. Appl. No. 18/361,850, dated Dec. 30, 2025.
US Non-Final Office Action, U.S. Appl. No. 18/361,850, dated Dec. 30, 2025.
US Notice of References Cited, U.S. Appl. No. 18/357,121, dated Feb. 11, 2026.
US Notice of Allowance, U.S. Appl. No. 18/357,121, dated Feb. 11, 2026.
US Final Office Action, U.S. Appl. No. 18/499,256, dated Feb. 26, 2026.
US Final Office Action, U.S. Appl. No. 18/661,626, dated Jan. 23, 2026.
US Notice of References Cited, U.S. Appl. No. 18/661,626, dated Jan. 23, 2026.
US Final Office Action, U.S. Appl. No. 18/783,523, dated Jan. 29, 2026.
US Notice of References Cited U.S. Appl. No. 18/783,523, dated Jan. 29, 2026.
US Notice of References Cited, U.S. Appl. No. 18/914,180, dated Mar. 4, 2026.
US Non-Final Office Action, U.S. Appl. No. 18/914,180, dated Mar. 4, 2026.

* cited by examiner

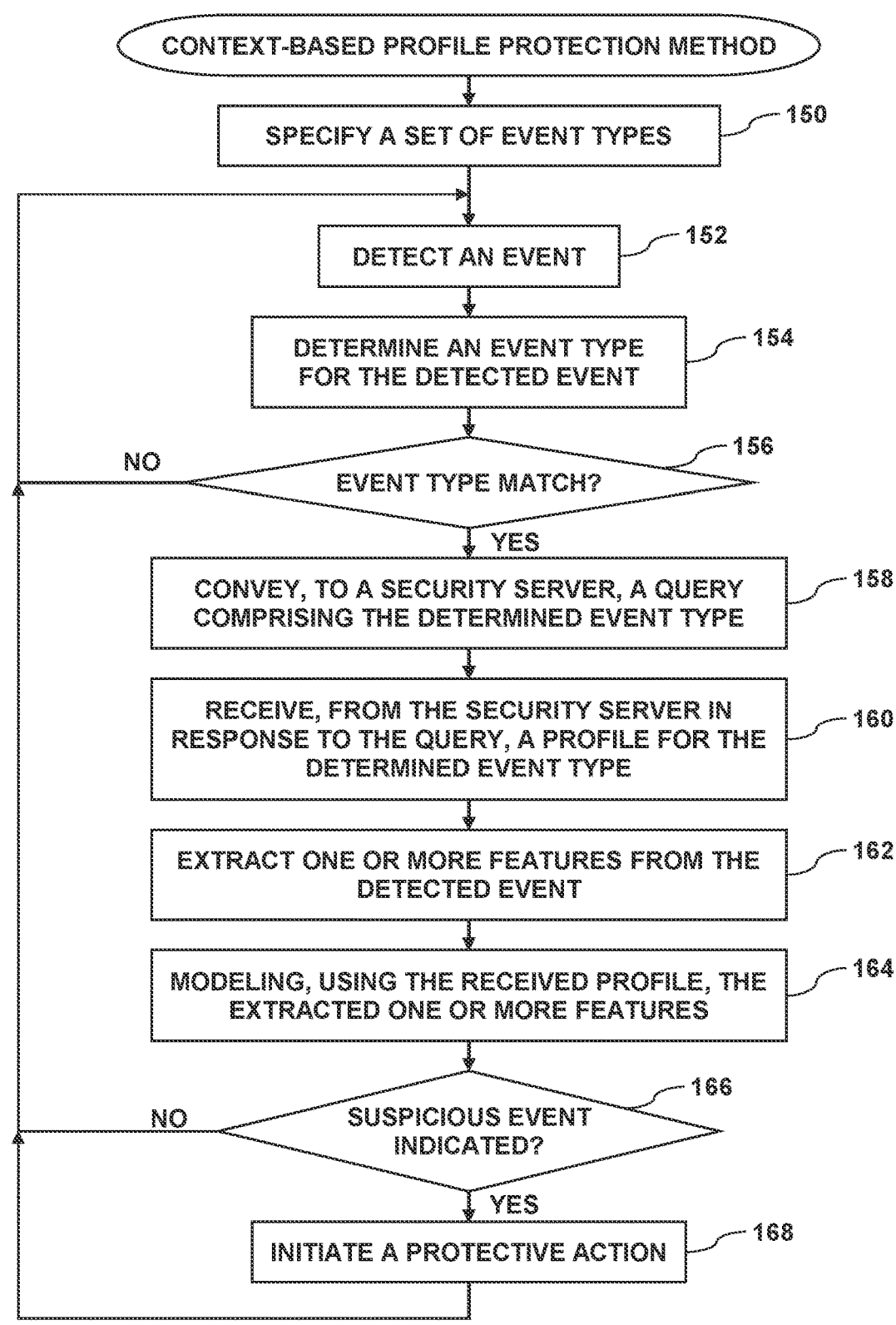

CONTEXT-BASED PROFILE PROTECTION METHOD

SPECIFY A SET OF EVENT TYPES — 150

DETECT AN EVENT — 152

DETERMINE AN EVENT TYPE
FOR THE DETECTED EVENT — 154

EVENT TYPE MATCH? — 156          NO

YES

CONVEY, TO A SECURITY SERVER, A QUERY
COMPRISING THE DETERMINED EVENT TYPE — 158

RECEIVE, FROM THE SECURITY SERVER IN
RESPONSE TO THE QUERY, A PROFILE FOR THE
DETERMINED EVENT TYPE — 160

EXTRACT ONE OR MORE FEATURES FROM THE
DETECTED EVENT — 162

MODELING, USING THE RECEIVED PROFILE, THE
EXTRACTED ONE OR MORE FEATURES — 164

SUSPICIOUS EVENT
INDICATED? — 166          NO

YES

INITIATE A PROTECTIVE ACTION — 168

FIG. 6

AGENT PREVENTION AUGMENTATION BASED ON ORGANIZATIONAL LEARNING

FIELD OF THE INVENTION

The present invention relates generally to computer security, and particularly to protecting computing devices that communicate over a data network.

BACKGROUND OF THE INVENTION

In many computers and network systems, multiple layers of security apparatus and software are deployed in order to detect and repel the ever-growing range of security threats. At the most basic level, computers use anti-virus software to prevent malicious software from running on the computer. At the network level, intrusion detection and prevention systems analyze and control network traffic to detect and prevent malware from spreading through the network.

The description above is presented as a general overview of related art in this field and should not be construed as an admission that any of the information it contains constitutes prior art against the present patent application.

SUMMARY OF THE INVENTION

There is provided, in accordance with an embodiment of the present invention, a method including collecting, in a security server via a network, reports from multiple computing devices of events belonging to a set of specified event types occurring in execution of software processes on the computing devices, collating the collected reports in the security server to extract context information with respect to each of the events, detecting, by a security agent running on a given computing device, an event occurring in execution of a software process on the given computing device and matching one of the event types, extracting, by the security agent, one or more features from the detected event, conveying a query with respect to the detected event over the network from the security agent to the security server, receiving, from the security server in response to the query, the context information with respect to the detected event, and deciding, by the security agent, to initiate a protective action on the given computing device based on the context information received from the security server and the one or more features extracted by the security agent.

In one embodiment, the reports include event logs maintained by the computing devices.

In another embodiment, deciding to initiate the protective action on the given computing device based on the context information received from the security server includes receiving, by the security agent, a profile for the matched one of the event types, and modeling, using the profile, the one or more features.

In an additional embodiment, the context information includes a frequency of the matched one of the event types.

In a further embodiment, the context information includes a recency of the matched one of the event types.

In a supplemental embodiment, the event includes the given computing device receiving a file via the network. In some embodiments, initiating the protective action includes preventing the given computing device from storing the file to a storage device. In other embodiments, initiating the protective action includes preventing the given computing device from accessing the file.

In one embodiment, the event includes the given computing device establishing a connection to a web site. In some embodiments, initiating the protective action includes closing the connection.

In another embodiment, initiating the protective action includes terminating execution of the software process.

There is also provided, in accordance with an embodiment of the present invention, an apparatus including a memory configured to store a security agent, and a processor configured to communicate over a network with a security server, which collects, via the network, reports from multiple computing devices of events belonging to a set of specified event types occurring in execution of software processes on the computing devices, and collates the collected reports to extract context information with respect to each of the events, wherein the processor is configured to execute the security agent so as to detect an event occurring in execution of a software process on the given computing device and matching one of the event types, to extract one or more features from the detected event, to convey a query with respect to the detected event over the network from the security agent to the security server, to receive, from the security server in response to the query, the context information with respect to the detected event, and to decide to initiate a protective action on the given computing device based on the context information received from the security server and the one or more features extracted by the security agent.

There is additionally provided, in accordance with an embodiment of the present invention, a computer software product, the product including a non-transitory computer-readable medium, in which program instructions are stored, which instructions, when read by a computer, cause the computer, to communicate over a network with a security server, which collects via the network, reports from multiple computing devices of events belonging to a set of specified event types occurring in execution of software processes on the computing devices, and collates the collected reports to extract context information with respect to each of the events, to detect an event occurring in execution of a software process on the computer and matching one of the event types, to extract one or more features from the detected event, to convey a query with respect to the detected event over the network to the security server, to receive, from the security server in response to the query, the context information with respect to the detected event, and to decide to initiate a protective action on the given computing device based on the context information received from the security server and the one or more features extracted by the computer.

BRIEF DESCRIPTION OF THE DRAWINGS

The disclosure is herein described, by way of example only, with reference to the accompanying drawings, wherein:

FIG. 6 is a flow diagram that schematically illustrates a method of using the context-based profiles to protect the computing devices, in accordance with an embodiment of the present invention.

DETAILED DESCRIPTION OF EMBODIMENTS

Indicator of compromise (IOC) is a forensic term that refers to evidence on a computing device that indicates a security breach. IOC data is typically gathered subsequent to detecting malicious activity such as a suspicious incident or a security event. However, IOC data collected by the computing device may not provide sufficient context to detect the continually growing universe of malicious activity.

Embodiments of the present invention provide methods and systems for leveraging organizational learning to provide context-based real-time protection for computing devices that communicate over data networks such as the Internet. As described hereinbelow, a security server collects, via a network, reports from multiple computing devices of events belonging to a set of specified event types occurring in execution of software processes on the computing devices. The security server can then collate the collected reports in the security server to extract context information with respect to each of the events.

Subsequent to the security server extracting the context information, a security agent running on a given computing device detects an event occurring in execution of a software process on the given computing device and matching one of the event types. The security agent extracts one or more features from the detected event, and then conveys a query with respect to the detected event over the network from the security agent to the security server. Upon receiving, from the security server in response to the query, the context information with respect to the detected event, the security agent can initiate a protective action on the given computing device based on the context information received from the security server and the one or more features extracted by the security agent.

By collecting events from multiple computing devices, systems implementing embodiments of the present invention can enhance existing behavioral threat protection and analytics profiling engines by having the security agent leverage learning done on historical data from the same security agent, other security agents, other peer group, organizational and cross customer data. This can enable the security agent to make a real-time decision as to whether or not to block suspicious behavior based on additional context than observed by the security agent itself. Additionally, providing additional context for events can enable new detection enhancements such false positive reduction and detecting new types of suspicious events.

SYSTEM DESCRIPTION

Figure 1:
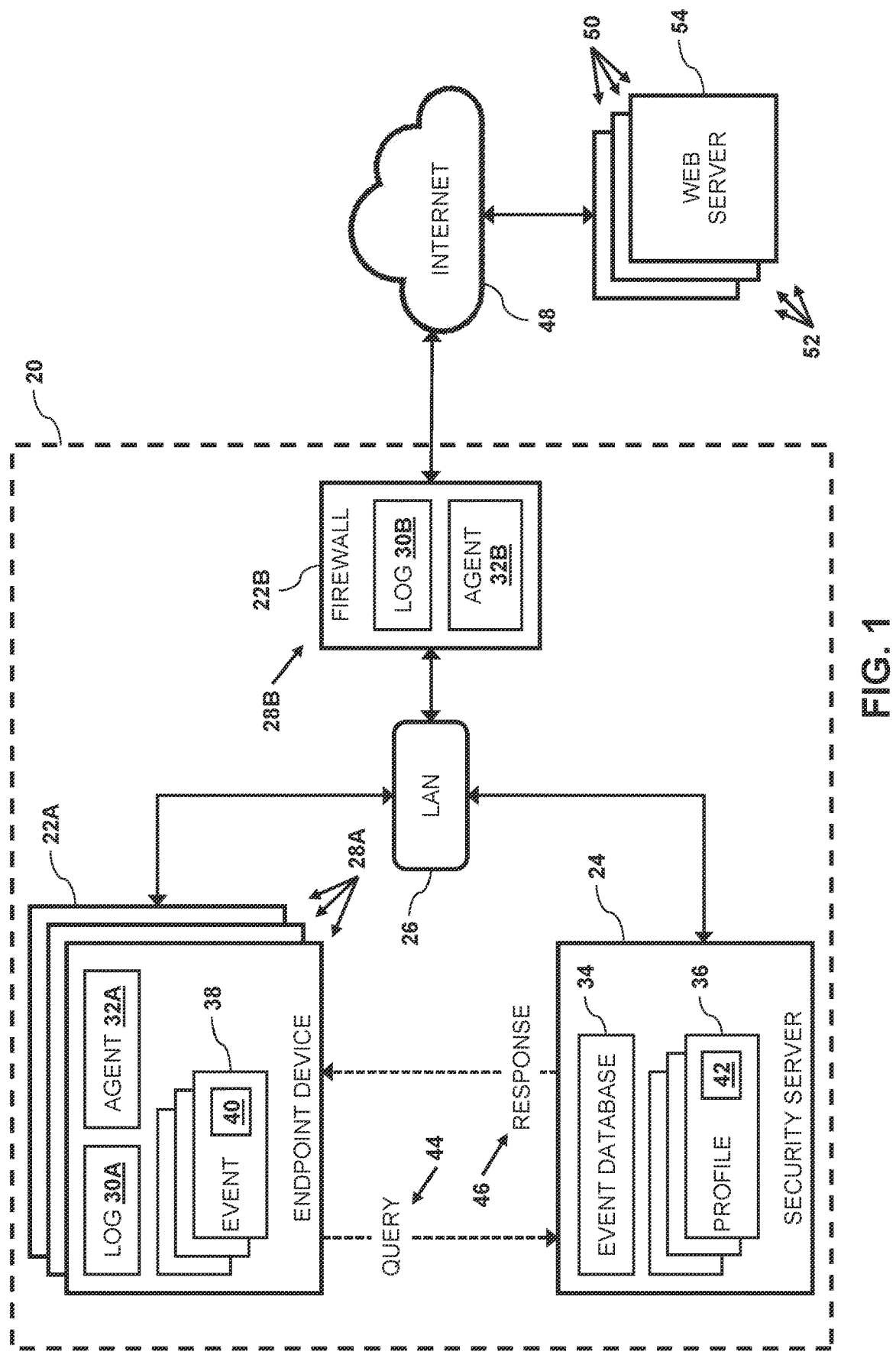
FIG. 1 is a block diagram that schematically shows a computing facility comprising a security server that maintains a set of context-based profiles, and a plurality of firewall and endpoint computing devices that comprise respective event logs, in accordance with an embodiment of the present invention.

FIG. 1 is a block diagram that schematically shows an example of a computing facility 20 comprising a set of computing devices 22 that communicate over a private data network such as local area network (LAN) 26, in accordance with an embodiment of the present invention. In FIG. 1, computing devices 22 and their respective software and data components can be differentiated by appending a letter to the identifying numeral, so that the computing devices comprise endpoint devices 22A and firewall 22B. Endpoint devices 22A are described in the description referencing FIG. 2 hereinbelow.

In the configuration shown in FIG. 1, each given computing device 22 has a respective unique identifier 28 (e.g., a MAC address) and may comprise an event log 30 and a security agent 32 (e.g., CORTEX XDR™ produced by PALO ALTO NETWORKS, INC., of 3000 Tannery Way, Santa Clara, CA 95054 USA) that executes on and protects the given computing device. In some embodiments, security server 24 may comprise an event database 34 and a set of context-based profiles 36.

Event logs 30 comprise respective reports maintained by multiple computing devices 22 of events 38 belonging to a set of specified event types 40 occurring in execution of software processes (FIG. 2) on the computing devices and are described in the description referencing FIG. 3 hereinbelow. Security server 24, event database 34 and context-based profiles 36 are described in the description referencing FIG. 4 hereinbelow.

In embodiments described herein, each computing device 22 stores events 38 to its respective event log 30. Security server 24 collects and aggregates the event logs to event database 34, and then can generate context-based profiles 36 based on data stored in the event database.

In some embodiments, each event 38 may comprise a respective event type 40, and each context-based profile 36 may have a respective profile type 42 that matches a given event type 40. In these embodiments, upon a given endpoint device 22A detecting a given event 38 (i.e., in the given endpoint device) comprising a given event type 40, the given endpoint device can then convey, to security server 24, a query 44 indicating the given event type. Upon receiving the query, security server 24 can identify a given context-based profile 36 whose respective profile type 42 matches the given event type, and then convey, to the given computing device (i.e., in response to query 44) a response 46 comprising the identified profile.

In the configuration shown in FIG. 1, firewall 22B couples LAN 26 to a public data network such as Internet 48, thereby enabling endpoint devices 22A to access websites 50 that have respective domain names 52 and are hosted on one or more web servers 54.

While embodiments herein describe security server 24 populating event database 34 with information from events 38 stored in event logs 30A and 30B, populating the event database with information from other even logs is considered to be within the spirit and scope of the present invention. In one example, security server 24 can collect, via Internet 48, information from event logs in computing devices 22 that are connected to other LANs 26 (e.g., from multiple departments in one or more organizations). In another example, security server 24 can collect, via Internet 48, information from event logs maintained by Software as a Service (SaaS) servers.

Figure 2:
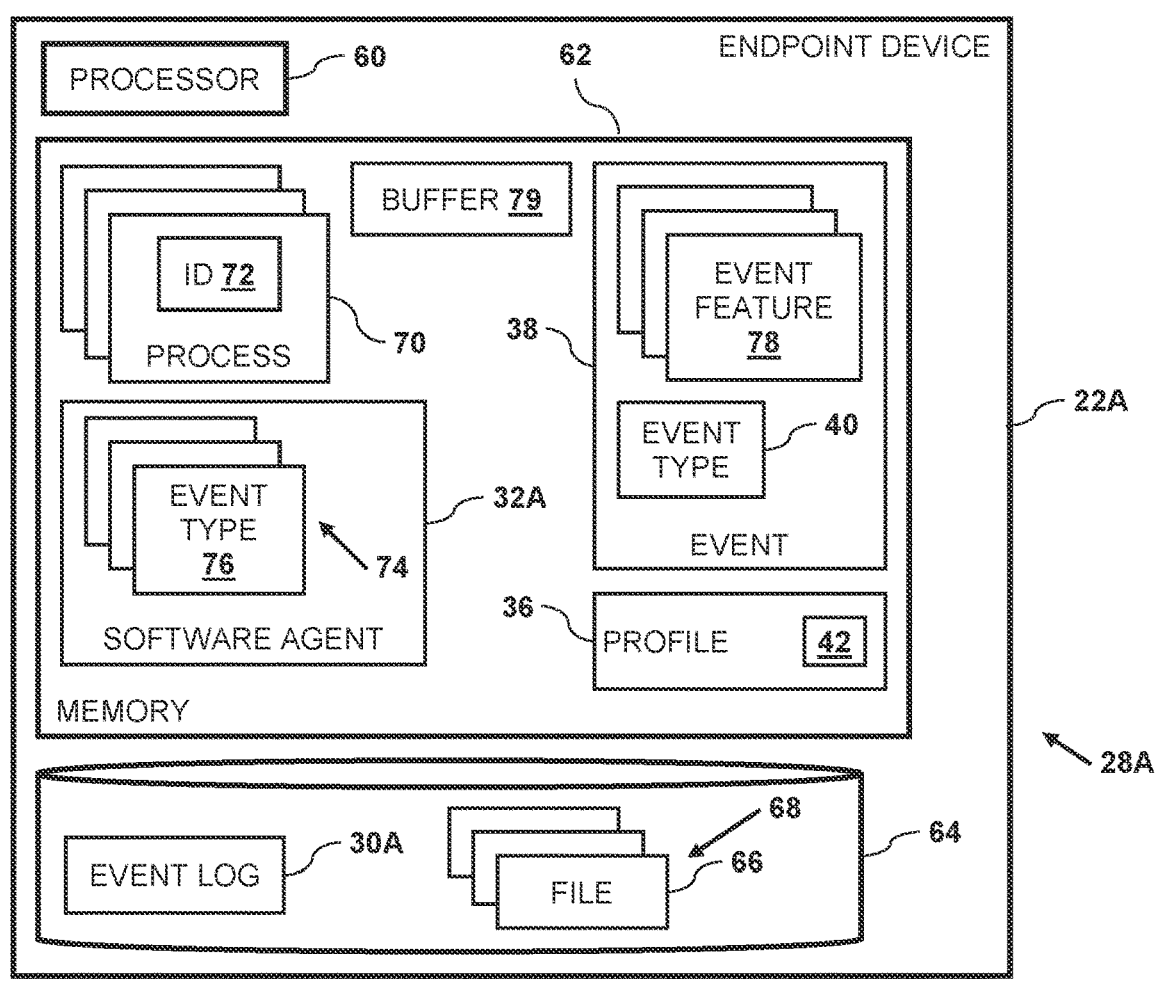
FIG. 2 is a block diagram showing an example of hardware, software and data components of a given computing device, in accordance with an embodiment of the present invention.

FIG. 2 is a block diagram showing hardware, software and data components in a given endpoint device 22A, in accordance with an embodiment of the present invention. In some embodiments, a given endpoint device 22A comprise a computing device that communicates back and forth with a data network (e.g., LAN 26) to which it is connected. Examples of endpoints include, but are not limited to desktop computers, laptop computers, smartphones, tablet devices, servers, workstations and Internet-of-things (IoT) devices.

Each given endpoint device may comprise an endpoint processor 60, an endpoint memory 62 and an endpoint storage device 64 that comprises a given event log 30A and a set of files 66 that the endpoint processor can organize in multiple directories 68 on the endpoint storage device. In the configuration shown in FIG. 2, processor 60 (or other processors in the given endpoint device) can execute, from memory 62, security agent 32 and multiple software processes 70 that have respective process identifiers (IDs) 72.

In some embodiments, security agent 32 comprises a list 74 of agent event types 76. Upon executing one or more software processes 70, processor 60 may detect a given event 38 comprising a set of event features 78. Processor 60 can determine a given event type 40 for the given event, and upon detecting a given agent event type 76 matching the given event type 40, the endpoint processor can use embodiments described hereinbelow to retrieve, from security server 24, a given context-based profile 36 whose respective profile ID 42 matches the given event type 40 (and the given agent event type 76), and store the retrieved profile to memory 62.

In the configuration shown in FIG. 2, memory 62 may store a buffer 79. In some embodiments, when processor 60 receives a given file 66 (e.g., from a given web server 54), the endpoint processor can first store the given file to buffer 79, and destage the given file to storage device 64 upon receiving a notification from security agent 32 that a hash for given file is not suspicious.

Figure 3:
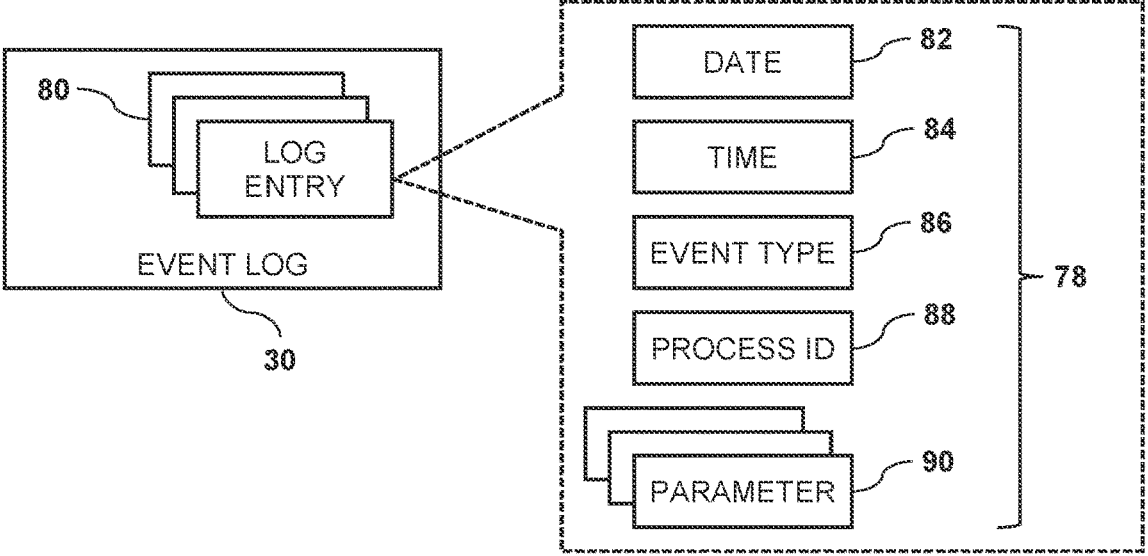
FIG. 3 is a block diagram showing an example of data components in a given event log, in accordance with an embodiment of the present invention.

FIG. 3 is a block diagram showing examples of data components in a given event log 30 for a given computing device 22, in accordance with an embodiment of the present invention. In the example shown in FIG. 3, the given event log comprises multiple log entries 80, wherein the log entries have a one-to-one correspondence with events 38 on the given computing device. For each given event 38, the given computing device can store, to the corresponding log entry 80, event features 78 such as:

A date 82 comprising a date on which security agent 32 executing on the given computing device detected the given event.

A time 84 comprising a time at which security agent 32 executing on the given computing device detected the given event.

An event type 86 comprising event type 40 for the given event. Examples of event types 40 are described hereinbelow.

A software process ID 88. In some embodiments, security agent 32 executing on the given computing device may detect a given software process 70 (also executing on the given computing device) caused the given event. In these embodiments, security agent 32 can store software process ID 72 for the given software process to software process ID 88.

One or more parameters 90 comprising details about the event.

A first example of a given event comprises the following actions performed by a given processor 60 on a given endpoint device 22A:

The given processor starts executing a web browser application that:

Accesses a given website 50 having a given domain name 52.

Downloads a given file 66 from the web site corresponding to the given domain name.

Stores the downloaded file to a given directory 68 on storage device 64.

In this example, processor 60 can create a new log entry 80, populate date 82 and time 84 accordingly, and:

Store a value to event type 86 indicating that the given event comprises a browser application downloading and storing a given file 66.

Store software process ID 72 for the web browser to software process ID 88 for the web browser software process.

Store the following information to parameters 90:

Processor 60 can compute a hash for the given file, and then store the computed hash to a given parameter 90.

A name of the web browser application (e.g., the CHROME™ browser produced by ALPHABET INC., 1600 Amphitheatre Parkway, Mountain View, CA 94043, USA).

The given domain name.

A name of the given directory on the storage device.

A second example of a given event comprises the following actions performed by a given processor 60 on a given endpoint device 22A:

The given processor starts executing a command-line shell.

The command-line shell runs a command-line shell script that accesses a given website 50 having a given domain name 52.

In this example, processor 60 can create a new log entry 80, populate date 82 and time 84 accordingly, and:

Store a value to event type 86 indicating that the given event comprises the command-line shell script that accesses a given website 50 having given domain name 52.

Store software process ID 72 for the command-line shell to software process ID 88 for the web browser software process.

Store the following information to parameters 90:

A name of the command-line shell (e.g., POWER-SHELL™, PRODUCED BY MICROSOFT CORPORATION, Redmond, WA, U.S.A.).

The given domain name.

Figure 4:
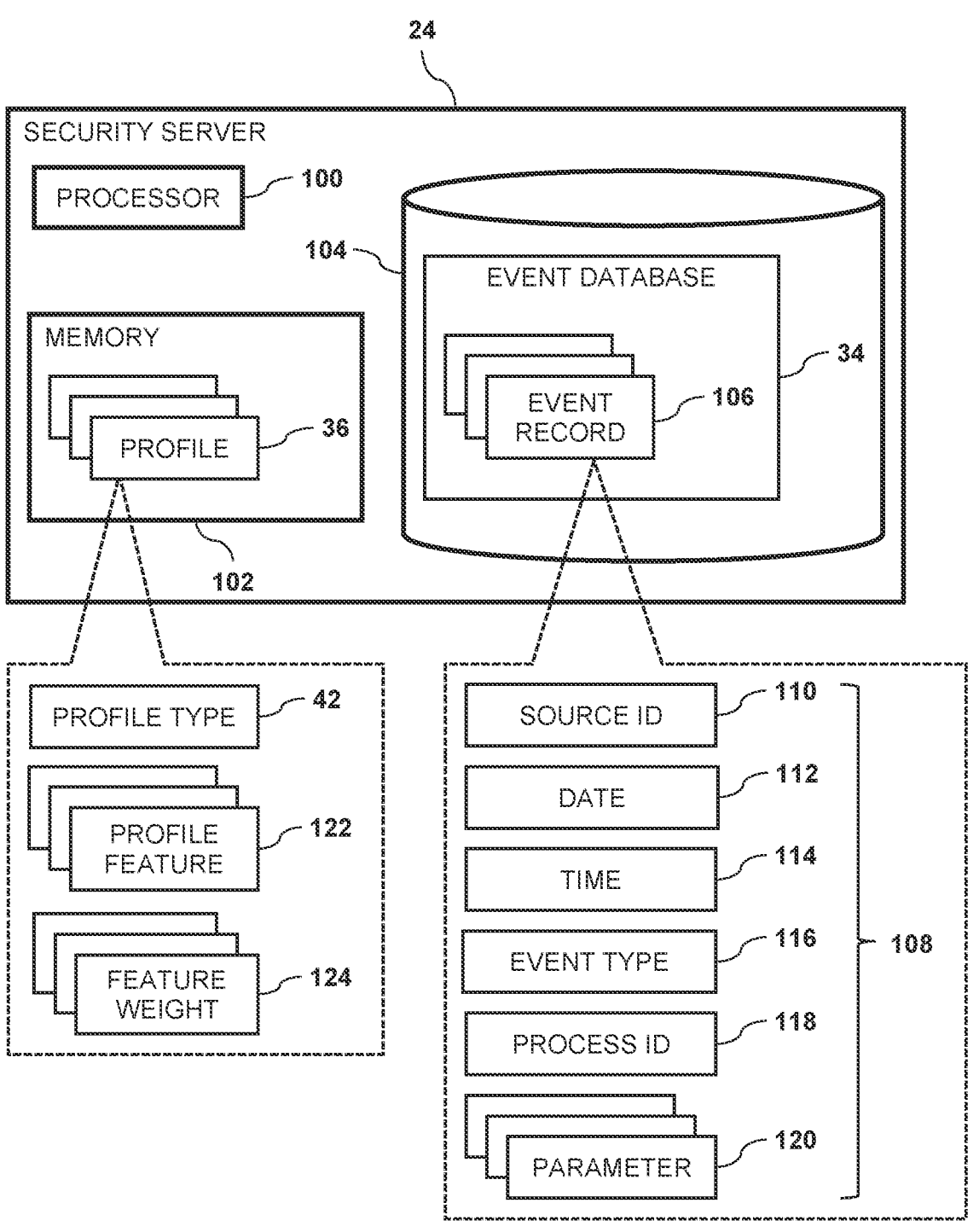
FIG. 4 is a block diagram showing an example of hardware, software and data components in the security server, in accordance with an embodiment of the present invention.

FIG. 4 is a block diagram showing hardware, software and data components in security server 24, in accordance with an embodiment of the present invention. In the configuration shown in FIG. 4, security server 24 comprises a server processor 100, a server memory 102 that stores context-based profiles 36, and a server storage device 104 that stores event database 34.

Event database comprises a set of event records 106. Each event record 106 stores event record features 108 from a given event log entry 80 that processor 100 collects from a given computing device 22. Examples of event record features 108 that processor 100 can store to each event record 106 includes (i.e., for a given log entry 80 from a given computing device 22):

A source ID 110 referencing device ID 28 for the given computing device.

A date 112 indicating date 82 in the given log entry.

A time 114 indicating time 84 in the given log entry.

An event type 116 indicating event type 86 in the given log entry.

A software process ID 118 indicating software process ID 88 in the given log entry.

One or more parameters 120 indicating the one or more parameters 90 in the given log entry.

In addition to profile type 42 that indicates a given event type 40, each context-based profile 36 comprises a set of profile features 122 and a corresponding set of feature weights 108. In one embodiment, a given context-based profile 36 may comprise a single profile feature 122 corresponding to single event feature 78 (e.g., a given software process ID 118). In other embodiments, a given context-based profile 36 may comprise multiple profile features 122 that correspond to multiple event features 78 (e.g., dates 112 for event records 106 having the same combination of a given event type 116 and a given software process ID 118), and corresponding feature weights 124.

In embodiments described hereinbelow, a given context-based profile 36 comprising a given profile type 42 can provide context to a given event 38 whose event type 40 matches the given profile type. To provide context for a given set of profile features 122 and feature weights 124 in a given context-based profile 36, processor 100 can compute context information such as:

The earliest detection (i.e., date 112 and time 114) of the given set of features in event records 106.

The most recent of the given set of features in event records 106.

A frequency of the given set of features in event records 106 during one or more specified time periods (e.g., 30, 60 and 90 days)

In some embodiments, the context can indicate a recency or frequency of a given event based on its respective set of features. In these embodiments, security agent 32 may consider events 38 comprising less recent and/or less frequent combinations of event features 78 to be more suspicious than more recent and/or more frequent combinations of event features 78 (i.e., as indicated by context-based profiles 36).

For example, a given endpoint device 22A executes the WINDOWS™ operating system (produced by Microsoft Corporation, Redmond, Washington), and the security agent executing the given device detects a given software process 70 saving a given file 66 to the "Windows" directory 68 on storage device 64. If the process ID for the given software process does not match the known process ID of the WINDOWS INSTALLER™ application, and the given file comprises executable code, then the security agent may indicate this activity as suspicious since this activity (i.e., a software process 70 other than WINDOWS INSTALLER™ saving an executable file 66 to the "Windows" directory 68) comprises anomalous activity.

In one embodiment, an organization (i.e., a company) may comprise one or more additional data networks 26 comprising respective sets of additional computing devices 22, processor 100 can collect additional log entries 80 from the event logs on the additional computing devices, and populate event database 34 with information from the additional log entries. In another embodiment, processor 100 can collect further log entries 80 from the event logs on computing devices 22 in other organizations in one or more geographic regions, and populate event database 34 with information from the further log entries.

In these embodiments, processor 100 can generate profiles 36 based on network (i.e., information from the log entries from a single data network 26), organizational (i.e., information from the log entries from a single organization), regional (i.e., information from the log entries from one or more geographical regions), and global features 108 network (i.e., information from all the log entries from multiple regions and/or organizations) from event database 34. In one example, processor 100 can create a given profile 36 that comprises a count of different organizations having at least one endpoint device 22A that accessed a given web site 50 having a given domain name 52. In another example, processor 100 can create a given profile 36 that comprises respective counts of endpoint devices 22A at different organizations that accessed a given web site 50 having a given domain name 52.

Processors 60 and 100 comprises a general-purpose central processing units (CPU) or special-purpose embedded processors, which are programmed in software or firmware to carry out the functions described herein. This software may be downloaded to endpoints 22A or security server 24 in electronic form, over a network, for example. Additionally or alternatively, the software may be stored on tangible, non-transitory computer-readable media, such as optical, magnetic, or electronic memory media. Further additionally or alternatively, at least some of the functions of processors 60 and 100 may be carried out by hard-wired or programmable digital logic circuits.

Examples of memories 62, 102 and storage devices 64, 104 include dynamic random-access memories, non-volatile random-access memories, hard disk drives and solid-state disk drives.

In some embodiments, tasks described herein performed by endpoint devices 22 and security server 24 may be split among multiple physical and/or virtual computing devices such as physical servers and/or virtual servers. In other embodiments, these tasks may be performed in a data cloud.

Context-Based Profile Creation Method

Figure 5:
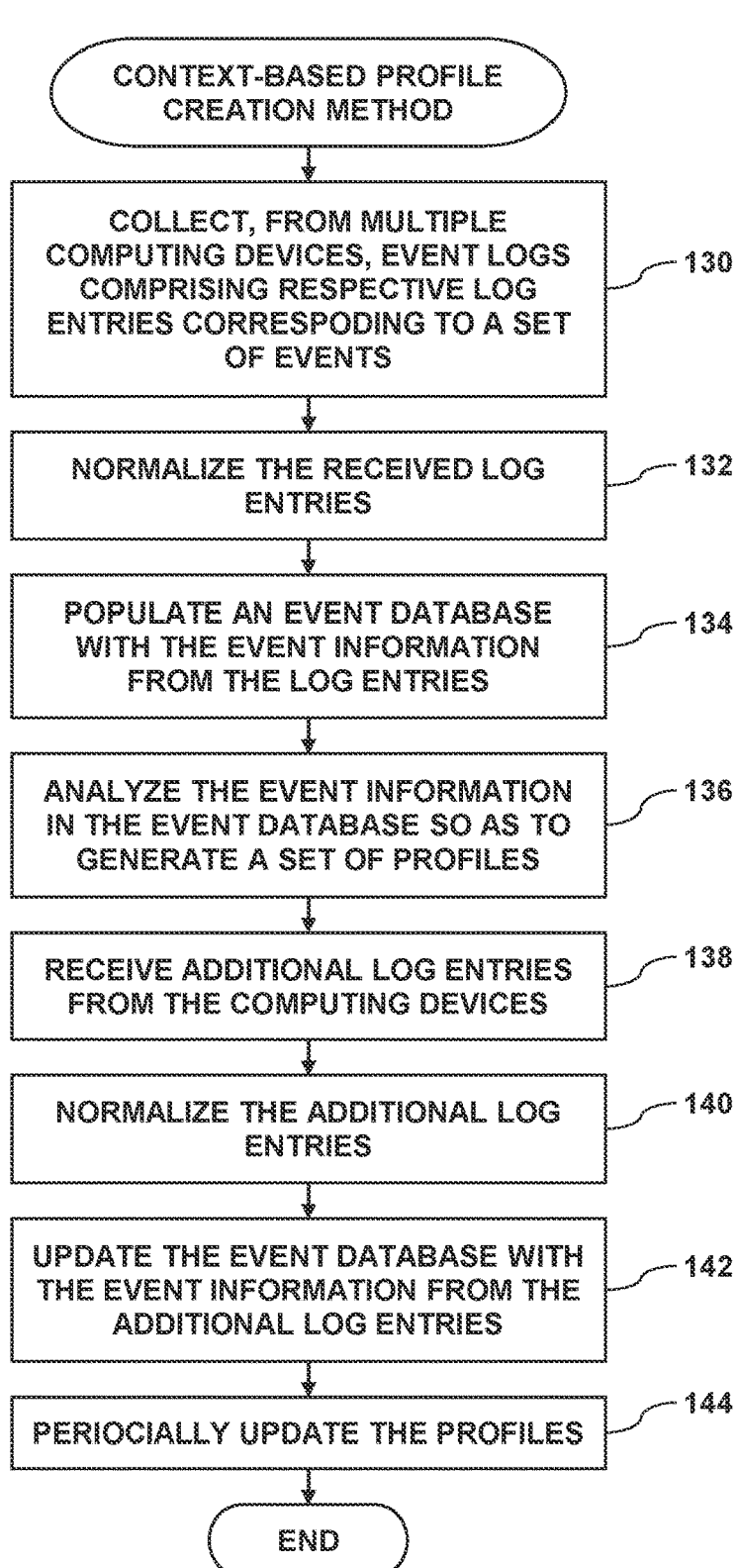
FIG. 5 is a flow diagram that schematically illustrates a method of creating the context-based profiles, in accordance with an embodiment of the present invention.

FIG. 5 is a flow diagram that schematically illustrates a method of creating context-based profiles 36, in accordance with an embodiment of the present invention In step 130, processor 100 collects, from multiple computing devices 22, event logs 30 comprising respective log entries 80 correspond to a set of events 38.

In step 132, processor 100 normalizes event features 78 in the received log entries.

In step 134, server processor 100 collates the collected event logs so as to extract context information with respect to each of the events corresponding to the log entries in the collected event logs. In some embodiments, extracting the context information comprises generating profiles 36, as described in the description referencing step 136 hereinbelow.

To collate the collected event logs, server processor 100 can create a corresponding set of event records 106, and populates, using embodiments described supra, event record features 108 with event features 78. In some embodiments, event logs 30 (e.g., event logs 30A and event 30B) may use different formats to store event features 78 in their respective log entries 80. Normalizing event features 78 in the received log entries enables processor to transform event features 78 (e.g., in event logs 30A and event 30B) to a single format so that information from event features 78 can be stored to event record features 108.

In step 136, processor 100 analyzes event record features 108 so as to generate profiles 36.

In step 138, processor 100 receives additional log entries 80 from computing devices 22.

In step 140, processor 100 normalizes event features 78 in the received additional log entries.

In step 142, processor 100 updates event database 34 by adding new event records 106, and storing the normalized features (i.e., step 140) to event record features 108 the new event records.

Finally, in step 144, processor 100 periodically (e.g., weekly or monthly) updates (i.e., recomputes) context-based profiles 36 with the current normalized features stored in event database 34, and the method ends.

Context-Based Profile Device Protection

FIG. 6 is a flow diagram that schematically illustrates a method of using context-based profiles 36 to protect computing devices 22, in accordance with an embodiment of the present invention. In some embodiments, the steps in FIG. 6 can be performed by a given endpoint processor 60 in a given endpoint device 22A executing security agent 32A so as to protect the given endpoint device from malicious activity conveyed via LAN 26 and/or Internet 48.

In step 150 the given endpoint processor specifies a set of agent event types 76. To specify agent event types 76, processor 60 can convey an event type request to security server 22. In response to receiving the event type request, security server 22 can identify (all) profile types 42 in context-based profiles 36 and conveys, to the given endpoint device, a response comprising the identified profile types. Upon receiving the response, processor 60 can store the received profile types 42 to agent event types 76.

In step 152, the given endpoint processor detects a new event 38 occurring in execution of a given software process executing on the given endpoint device.

In step 154 the given endpoint processor determines event type 40 for the new event.

In step 156, the given endpoint processor compares event type 40 to agent event types 76. If the given endpoint processor detects a given agent event type 76 that matches event type 40, then in step 158 the given endpoint processor conveys, to security server 24 via LAN 26, query 44 comprising event type 40. Upon receiving query 44, processor 100 identifies a given context-based profile 36 whose respective profile type 42 matches the event type 40 in the received query, and conveys, to the given endpoint device, response 46 comprising the identified context-based profile.

In step 160, the given endpoint processor receives, in response to query 44, response 46 comprising the given identified context-based profile.

In step 162, the given endpoint processor extracts one or more event features 78 from the new event. Examples of event features 78 are described in the description referencing FIG. 3 hereinabove.

In step 164, the given endpoint processor decides, based on the context information received from the security server and the one or more features extracted by the security agent, whether or not the new event comprises suspicious activity. As described supra, the context information may comprise a given context-based profile 36.

To perform step 164, the given endpoint processor can use the received context-based profile to model the one or more features. As described supra, processor 100 generates context-based profiles 36 based on event features 78 that the server processor extracted from multiple log entries 80 in event logs 30 received from multiple computing devices 22. Therefore, a given context-based profile 36 comprising a given profile type 42 comprises event features 78 extracted from multiple log entries 80 received from multiple computing devices and whose respective event type 86 matches the given profile type.

In some embodiments, modeling the one or more features can indicate whether or not the new event is suspicious. For example, by using the received context-based profile to model the one or more features, the given endpoint proces-sor can compute a suspiciousness score (not shown), and flag the new event as suspicious if the suspiciousness score is either greater than or less than a specified threshold. In some embodiments, the given endpoint processor can compute the suspiciousness score by extracting event features 78 from the new event, assigning one or more of the extracted event features to profile features 122, and applying the feature weights to the profile features.

In step 166, if modeling the one or more features indicates that the new event is suspicious, then in step 168, the given endpoint processor initiates a protective action with respect to the new event, and the method continues with step 152. In some embodiments, the protective action can prevent completion of any "bad behavior" initiated by a given (malicious) software process 70.

Examples of protective actions that the given endpoint processor can perform include, but are not limited to:

Identifying a given software process 70 that generated the new event, and then terminate execution (i.e., kill) the given software process.

If the new event comprises a given software process 70 (e.g., a web browser) connecting to a given website 50, then the given endpoint processor can terminate the connection.

If the new event comprises receiving (i.e., downloading) a given file 66 via network 26 (and/or Internet 48), then the given endpoint processor can perform operation such as:

Once the given file is downloaded, preventing any access to the given file. For example, if the given file comprises executable code, then the given endpoint processor can prevent execution of the code.

If the given file was downloaded to buffer 79 but was not yet destaged to storage device 64, then the given endpoint processor can delete the given file from the buffer, thereby preventing the destaging.

Returning to step 166, if modeling the one or more features does not indicate that the new event is suspicious, then the method continues with step 152. Returning to step 156, If the given endpoint processor does not detect a match between event type 40 and any given agent event type 76, then the method continues with step 152.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for computer protection, comprising:

detecting, by a security agent running on an endpoint computing device, an event of given event type associated with suspicious behavior occurring in execution of a software process by the endpoint computing device;

conveying a query with respect to the event type over a network from the security agent to a security server;

receiving, from the security server in response to the query, context information with respect to the event type based on collation of event reports from multiple endpoint computing devices;

extracting, by the security agent, one or more features from the detected event;

making a real-time decision, by the security agent, whether to block the suspicious behavior on the endpoint computing device based on the context information received from the security server and the one or more features extracted by the security agent, wherein the context information comprises a profile for the given event type, the profile comprising a set of profile features and a corresponding set of feature weights, wherein the feature weights are determined based on at least one of a frequency and a recency of the profile features in event records, and wherein making the real-time decision comprises computing a suspiciousness score by applying the feature weights to the one or more features extracted from the detected event wherein less frequent or less recent feature combinations are weighted to produce a higher suspiciousness score; and initiating a protective action by the security agent on the endpoint computing device in response to the decision.

2. The method according to claim 1, wherein the event reports comprise event logs maintained by the computing devices.

3. The method according to claim 1, wherein ARM a making the real-time decision comprises modeling the one or more features.

4. The method according to claim 1, wherein the context information comprises a frequency of occurrence of the event type on other endpoint computing devices in the network.

5. The method according to claim 1, wherein the context information comprises a recency of occurrence of the event type on other endpoint computing devices in the network.

6. The method according to claim 1, wherein the event comprises receiving a file via the network at the endpoint computing device.

7. The method according to claim 6, wherein initiating the protective action comprises preventing the endpoint computing device from storing the file to a storage device.

8. The method according to claim 6, wherein initiating the protective action comprises preventing the endpoint computing device from accessing the file.

9. The method according to claim 1, wherein the event comprises establishing a connection between the endpoint computing device and a web site.

10. The method according to claim 9, wherein initiating the protective action comprises closing the connection.

11. The method according to claim 1, wherein initiating the protective action comprises terminating execution of the software process.

12. The method according to claim 1, wherein the context information comprises an identifier of a software application usually associated with the event type.

13. An endpoint computing device, comprising:

a memory configured to store a security agent; and a processor configured to execute the security agent so as to detect an event of given event type associated with suspicious behavior occurring in execution of a software process by the endpoint computing device, to convey a query with respect to the event type over a network from the security agent to a security server, to receive, from the security server in response to the query, context information with respect to the event type based on collation of event reports from multiple endpoint computing devices, wherein the security agent is configured to extract one or more features from the detected event, to make a real-time decision whether to block the suspicious behavior on the endpoint computing device based on the context information received from the security server and the one or more features extracted by the security agent, wherein the context information comprises a profile for the given event type, the profile comprising a set of profile features and a corresponding set of feature weights, wherein the feature weights are determined based on at least one of a frequency and a recency of the profile features in event records, and wherein making the real-time decision comprises computing a suspiciousness score by applying the feature weights to the one or more features extracted from the detected event, wherein less frequent or less recent feature combinations are weighted to produce a higher suspiciousness score, and to initiate a protective action by the security agent on the endpoint computing device in response to the decision.

14. A computer software product, comprising a non-transitory computer-readable medium, in which program instructions are stored, which instructions, when read by a processor in an endpoint computing device, cause the processor to execute a security agent so as to detect an event of given event type associated with suspicious behavior occurring in execution of a software process by the endpoint computing device, to convey a query with respect to the event type over a network from the security agent to a security server, to receive, from the security server in response to the query, context information with respect to the event type based on collation of event reports from multiple endpoint computing devices, wherein the instructions cause the security agent to extract one or more features from the detected event, to make a real-time decision whether to block the suspicious behavior on the endpoint computing device based on the context information received from the security server and the one or more features extracted by the security agent, wherein the context information comprises a profile for the given event type, the profile comprising a set of profile features and a corresponding set of feature weights, wherein the feature weights are determined based on at least one of a frequency and a recency of the profile features in event records, and wherein making the real-time decision comprises computing a suspiciousness score by applying the feature weights to the one or more features extracted from the detected event, wherein less frequent or less recent feature combinations are weighted to produce a higher suspiciousness score, and to initiate a protective action by the security agent on the endpoint computing device in response to the decision.

15. The product according to claim 14, wherein making the real-time decision comprises modeling the one or more features.

16. The product according to claim 14, wherein the context information comprises a frequency of occurrence of the event type on other endpoint computing devices in the network.

17. The product according to claim 14, wherein the context information comprises a recency of occurrence of the event type on other endpoint computing devices in the network.

18. The product according to claim 14, wherein the event comprises receiving a file via the network at the endpoint computing device.

19. The product according to claim 14, wherein the event comprises establishing a connection between the endpoint computing device and a web site.

20. The product according to claim 14, wherein initiating the protective action comprises terminating execution of the software process.

21. The product according to claim 14, wherein the context information comprises an identifier of a software application usually associated with the event type.

* * * * *